United States Patent [19]
Cattan et al.

[11] Patent Number: 5,793,541
[45] Date of Patent: Aug. 11, 1998

[54] CONTROLLED AND STABILIZED PLATFORM

[75] Inventors: Gilles Cattan, Arpajon; Noël Ferrier, Montmorency; Claude Weber, Bois-Colombes, all of France

[73] Assignee: Societe d'Etudes et de Realisations Electroniques, Asnieres, France

[21] Appl. No.: 535,944

[22] Filed: May 16, 1990

[51] Int. Cl.[6] .......................... G01C 21/02; G02B 23/08; G02B 5/08

[52] U.S. Cl. .................. 359/843; 250/203.2; 250/203.3; 250/203.6; 359/402; 359/405; 359/406

[58] Field of Search .................. 356/5, 152; 89/41.02, 89/41.06, 41.09; 350/540; 250/342, 203.2, 203.3, 203.6; 33/235, 236, 252, 257, 267; 359/402, 405, 406, 843

[56] References Cited

U.S. PATENT DOCUMENTS

| | | |
|---|---|---|
| 3,401,599 | 9/1968 | Schönherr et al. .............. 89/41.09 X |
| 3,514,608 | 5/1970 | Whetter ........................ 89/41.06 X |
| 4,444,089 | 4/1984 | Pietzsch et al. ................. 89/41.02 X |
| 4,667,091 | 5/1987 | Gerlach ........................ 356/152 X |

*Primary Examiner*—Stephen C. Buczinski
*Attorney, Agent, or Firm*—Anderson Kill & Olick, PC; David Toren; Alexander Zinchuk

[57] ABSTRACT

In the controlled and stabilized platform (1) comprising a plurality of optical apparatuses, the optical apparatuses (8, 9, 10) are mounted in a casing (7) which is pivotable about a sight axis (12) in a bearing (13) which is pivotable about a bearing axis (14), the casing (7) and the bearing (13) being controlled about their axes (12) and (14) by motors (40) and (38) actuated by detectors measuring variations in the angular position of a stabilized input mirror (11) which reflects radiations going to the optical apparatuses or coming from the latter.

3 Claims, 3 Drawing Sheets

CONTROLLED AND STABILIZED PLATFORM

BACKGROUND OF THE INVENTION

The invention relates to onboard optical apparatuses. Controlled and stabilized platforms are known for onboard optical apparatuses which permit eliminating vibrations coming from the carrying vehicle and harmful to the resolution of the optical apparatuses, the decoupling of the movements of the vehicle and the remote control, in sight and bearing, for the observation, the acquisition of objectives, the pursuit of targets, etc. The stabilization is achieved by means of a gyroscope having two degrees of freedom whose kinetic moment is parallel to the optical axis of each apparatus, while its pivot axes are parallel to those of the platform. The gyroscope has a double function: in the absence of an order, it maintains the platform in a fixed situation in space, i.e. it decouples all of the optical apparatuses carried by the platform with respect to movements and vibrations of the carrying vehicle; upon reception of an order, it controls the orientation in bearing and sight of the platform; this control imparts to the platform in question the quality of stabilization notwithstanding changes in orientation and even in the course of these changes. The platforms of this type have relatively considerable mass and inertia so that a precise stabilization and a rapid control require the use of high driving powers. The fidelity of the response however remains poor.

Other types of platforms are known which overcome such drawbacks. These platforms comprise an arrangement in which their own stabilization is conjugate with an interior stabilization of the onboard optical apparatus or apparatuses, as described in patent No. 75-36999 filed on Dec. 3, 1975 in the name of the applicant. The platform is stabilized and controlled from data delivered by the gyroscope and any residual stabilization error, detected by the gyroscope, is employed for controlling either crossed optical deviators through which travels the beam leading to an onboard optical apparatus or coming from the latter, or a mirror movable about two perpendicular axes which performs the same function. Although these platforms, which may be termed platforms having two stabilization stages, offer the advantage of a good quality of stabilization compatible with the optical resolution of the apparatuses, they present the drawback of requiring an interior stabilization by means of an optical apparatus.

SUMMARY OF THE INVENTION

An object of the present invention is to overcome these drawbacks.

The invention therefore provides a controlled and stabilized platform comprising a plurality of optical apparatuses, wherein the incident radiations going through these optical apparatuses or coming therefrom are reflected by an input mirror stabilized in a universal joint arrangement by a gyroscope by which it is controlled, through a connection having a ratio of one half about a first bearing axis and through a connection having a ratio of one about a second sight axis, the gyroscope and the input mirror constituting an inertial unit which is housed and fixed, together with the optical apparatuses, in a casing pivotable about a sight axis in a bearing which is pivotable about a bearing axis relative to the base of the platform connected to the vehicle, the casing and the bearing being respectively driven about their pivot axes by motors controlled by signals delivered by detectors measuring the variations in the angular position of the input mirror.

According to a variant of the invention, the bearing axes may be the sight axes and the sight axes may be the bearing axes.

Preferably, the arrangement termed the universal joint arrangement and input mirror are provided with flexible pivots which allow, by elastic deformation thereof, the small angular movements about the bearing and sight axes.

DESCRIPTION OF THE DRAWINGS

The following description, with reference to the accompanying drawings given as a non-limitative example, will explain how the invention may be carried out.

DESCRIPTION OF THE PREFERRED EMBODIMENTS

Figure 2:
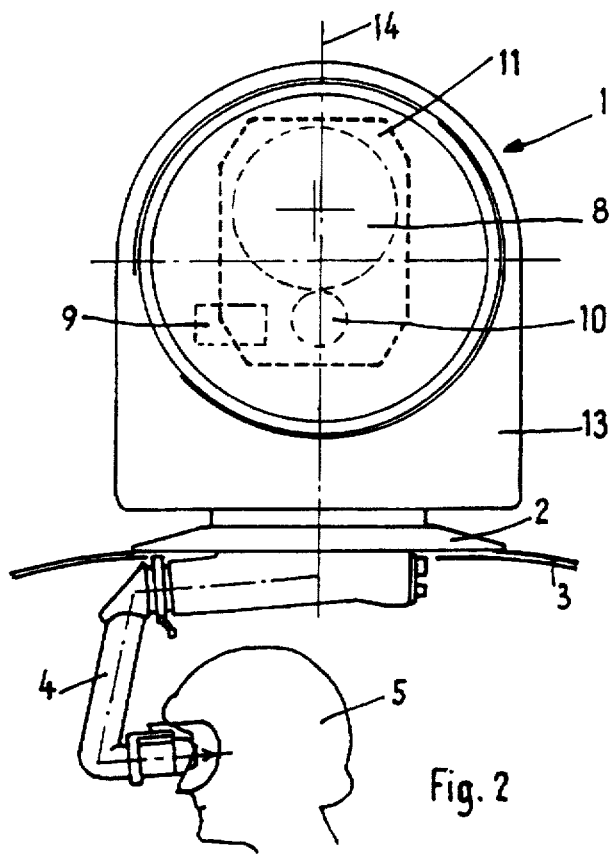
FIG. 2 is a side view of the platform of FIG. 1.
Figure 1:
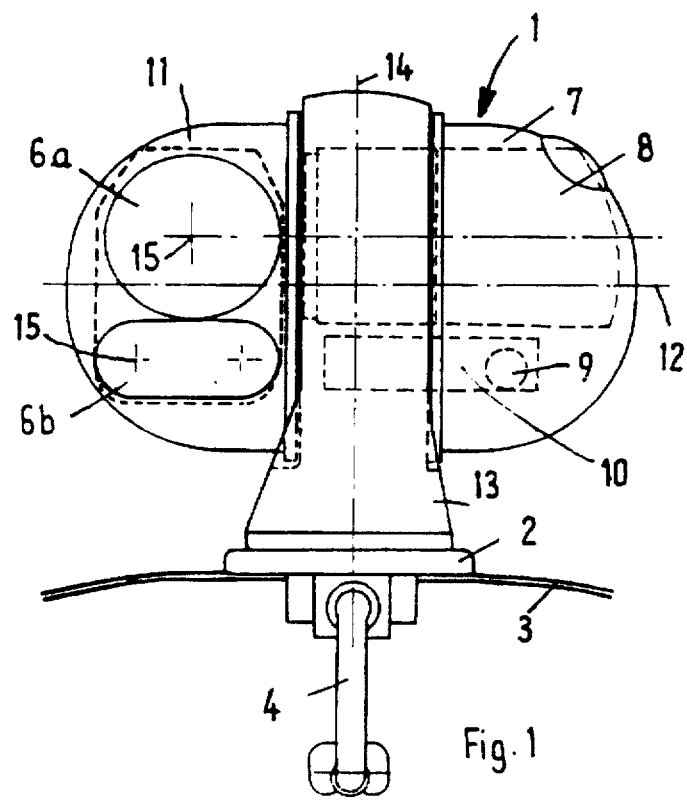
FIG. 1 is a front view of the controlled and stabilized platform containing the optical apparatuses.

In FIGS. 1 and 2, a controlled and stabilized platform 1 is formed by a base 2 mounted on the vehicle 3, and an adjustable viewfinder arm 4 of known construction which transmits to the observer 5 the image of the landscape viewed through the ports 6a and 6b of a casing 7 containing the optical elements of the visible path connecting the viewfinder arm 4 and all the required optical apparatuses, namely for example: an infrared ray camera 8 for the observation, a television camera 9 for missile deviation and a laser 10 for target range finding. The infrared ray path passes through the port 6a, and the other optical paths pass through the port 6b after return by a stabilized input mirror 11. For the purpose of exploring the landscape, the casing 7 is journalled about a first axis 12 in a bearing 13 which is journalled about a second axis 14 in the base 2 of the platform 1. The axes 12 and 14, which may be respectively the sight axis and bearing axis are perpendicular to each other and to the aiming directions 15 when the platform 1 is in a position termed "canonic" position as shown in the drawing. The input mirror 11 is stabilized by a gyroscope about a sight axis and a bearing axis; the casing 7 and the bearing 13 are respectively controlled about their pivot axes 12 and 14 by the position of this input mirror 11, as will be explained hereinafter in more detail.

Figure 3:
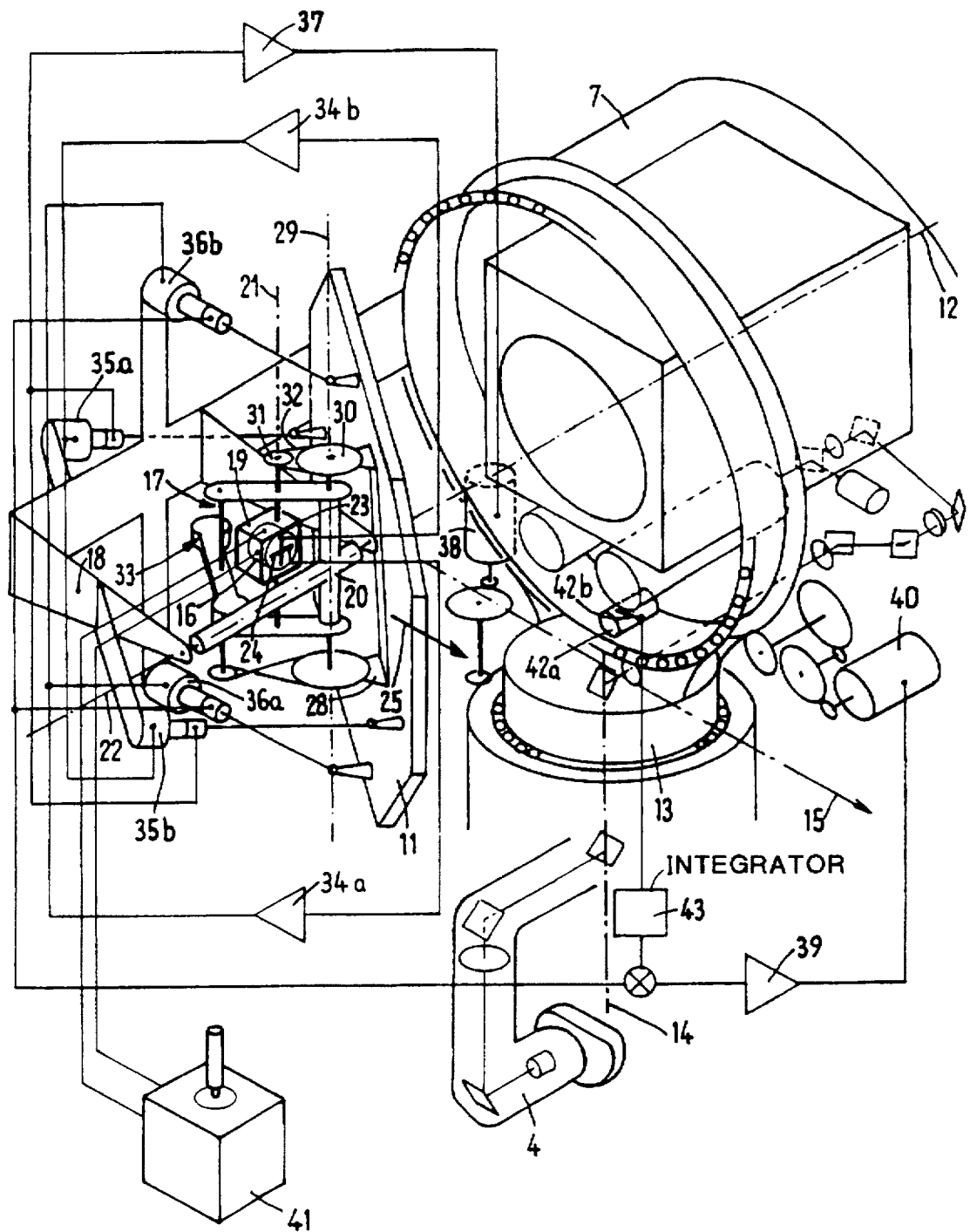
FIG. 3 is a diagrammatic perspective view of the arrangement of the platform of FIG. 1 and its mirror stabilized by a gyroscope.

In FIG. 3, a gyroscope 16 having two degrees of freedom is placed, by means of a universal joint arrangement 17 inside a support 18 connected to the casing 7. The universal joint arrangement 17 is constituted by a first frame 19 carrying the gyroscope 16 and mounted in a second frame 20 which is mounted inside the support 18. The first frame 19 is pivotable about a bearing axis 21 relative to the second frame 20 which may also pivot relative to the support 18 about a sight axis 22 perpendicular to the axis 21. The axes 21 and 22 are respectively parallel to the axes 12 and 14 in the "canonic" position as represented in the drawing.

The gyroscope 16 is placed in the frame 19 in such manner that its measuring axes 23 and 24 are respectively parallel to the axes 21 and 22, and in the "canonic" position its moment of inertia in direction 25 makes with the axes 21 and 22 a trirectangular trihedron.

Figure 4:
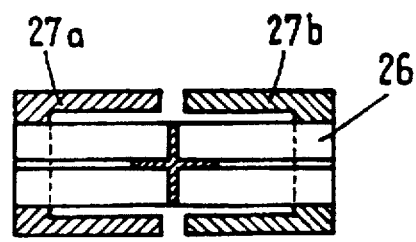
FIG. 4 is a sectional view of a flexible pivot of the stabilized mirror.

The axes about which pivot the first frame 19 and the second frame 20 are formed by shafts mounted on ball bearings or, better still, by flexible members which, by elastic deformation, allow a small angular movement. They are preferably, as shown in FIG. 4, formed by a torsion bar 26 having a cross-shaped section mounted at each end in a ring 27a and a ring 27b one ring being a drive fit in one frame and the other a drive fit in the other frame or in the support 18. The frames 19 and 20 are therefore pivotable with respect to each other and with respect to the support 18 through an angle of small value about the axes 21 and 22. This angle is on the order of a few degrees.

A yoke 28 carrying the input mirror 11 is fixed on the second frame 20. The plane of this input mirror 11 is parallel to the axis 21 and is inclined relative to the axis 22; the angle of inclination is preferably 45°. The mechanical connection between the frame 20 and the yoke 28 of the input mirror 19 is achieved by shafts or pivots identical to those described hereinbefore and shown in FIG. 4, to permit a slight angular movement of the input mirror 11 relative to the second frame 20 and to the gyroscope 16, about a bearing axis 29 parallel to the axis 21. The input mirror 11 is made to pivot about the axis 29 to an extent one-half of the extent to which the first frame 19 and the gyroscope 16 pivot about the axis 21, through a mechanical connection comprising pulleys connected by a band and providing a speed reducing ratio of one half.

A pulley 30 having a radius 2R is connected to the yoke 28, a second pulley 31 having a radius R is connected to the first frame 19 and these two pulleys 30 and 31 are interconnected by a metal band 32 fixed at each end to one of the pulleys. Any relative angular movement of the first frame 19 about its pivot axis 21 results in an angular movement of one half of the mirror 11 about its axis 29, or inversely. Further, any relative angular movement of the second frame 20 about its axis 22 results in an angular movement to the same extent of the input mirror 11 about this axis 22.

As the input mirror 11 only pivots through an angle of one half relative to the frame 19 carrying the gyroscope 16, an inertia-compensating unit 33, pivotally mounted in the frame 20, is driven in rotation in the opposite direction to the mirror by an assembly of pulleys and belts which connects it to the input mirror 11.

The gyroscope 16 is preferably a "flexible joint" gyroscope. Its measuring axes or shafts 23 and 24 are each provided with a torque motor and an angle detector (not shown in the drawing). The detectors give the orientation in space of the direction 25 of the kinetic moment of the gyroscope relative to its housing and relative to the frame 19.

The outputs of the detectors of the gyroscope 16 are respectively applied to the inputs of two amplifiers 34a and 34b whose outputs are connected to the terminals of a pair of devices having motors and homologous detectors 35a and 35b, and 36a and 36b.

The devices 35a, 35b, 36a and 36b are linear motors each also provided with a linear detector, as will be described hereinafter. These devices 35a, 35b and 36a, 36b placed between the support 18 and the input mirror 11 control in pairs, one pushing and the other pulling, respectively the orientation of the input mirror 11 about the axes 22 and 29 and the orientation of the frame 19 and of the housing of the gyroscope 16 about the axis 21 through the pulleys-band device 30, 31 and 32, and about the axis 22 of course until the output signals of the detectors of the gyroscope 16 are cancelled out. The housing of the gyroscope 16 pivoted about the axis 21 through an angle which is double the angle through which the input mirror 11 pivoted about the axis 29 owing to the effect of the pulleys-band connection so that the aiming direction 15 always remains parallel to the direction 25 of the kinetic moment of the gyroscope 16.

The gyroscope 16 and the input mirror 11 mounted and connected as described hereinbefore form an inertial unit which permits, by limited movements, finely stabilizing by means of a single mirror the axes of the optical apparatuses and the axis of the visible path leading to the viewfinder arm 4. Larger movements for shifting the inertial unit in a desired direction 15 relative to that of the vehicle or maintaining this direction fixed relative to the movements of the vehicle, are obtained by the controlling, about the axes 14 and 12, the bearing 13 and the casing 7 containing the inertial unit-gyroscope mirror and the optical apparatuses.

The data delivered by the linear detectors of the motor-detector devices 35a and 35b, after amplification in an amplifier 37, serve to actuate a motor 38 which resets the bearing 13 about the axis 14 to the bearing position of the gyroscope 16. The data delivered by the linear detectors of the motor-detector devices 36a and 36b, after amplification in an amplifier 39, serve to actuate a motor 40 which resets the casing 7 about the axis 12 to the sight position of the gyroscope 16.

In the drawing, the motors 38 and 40 respectively driving the bearing 13 and the casing 7 through gear speed reducers may, in order to avoid play, be replaced by wheels and flexible belts with an inextensible metal reinforcement.

In order to shift the aiming direction 15, independently of the movements of the carrying vehicle, a control stick 41 permits sending signals to the torque motors (not shown in the drawing) of the gyroscope 16 which effects a motion of precession and controls the input mirror 11 and the casing 7 and the bearing 13 which are made to follow the movements of the direction 25 of the kinetic moment of the gyroscope.

A gyrometer 42a, whose measuring axis is oriented perpendicular to the measuring axes 23 and 24 of the gyroscope 16 and parallel to the aiming axis 15 in the "canonic" position of the platform 1 as shown in the drawing, is mounted on the casing 7. The gyrometer 42a detects the destabilizing movements about the aiming axis. The output of its detector 42b is applied to the input of an integrator 43 connected to the amplifier 39 whose output is connected to the terminals of the motor 40 for resetting the casing 7 about the axis 12. The input mirror 11 stabilizes in bearing and in sight the radiations arriving at the optical apparatuses or coming from the latter and there is added in the feedback loop controlling the casing 7 which is made to follow the movements of the mirror 11 in sight, a correction for correcting the stabilization defects about the aiming axis detected by the gyrometer 42a.

Figure 5:
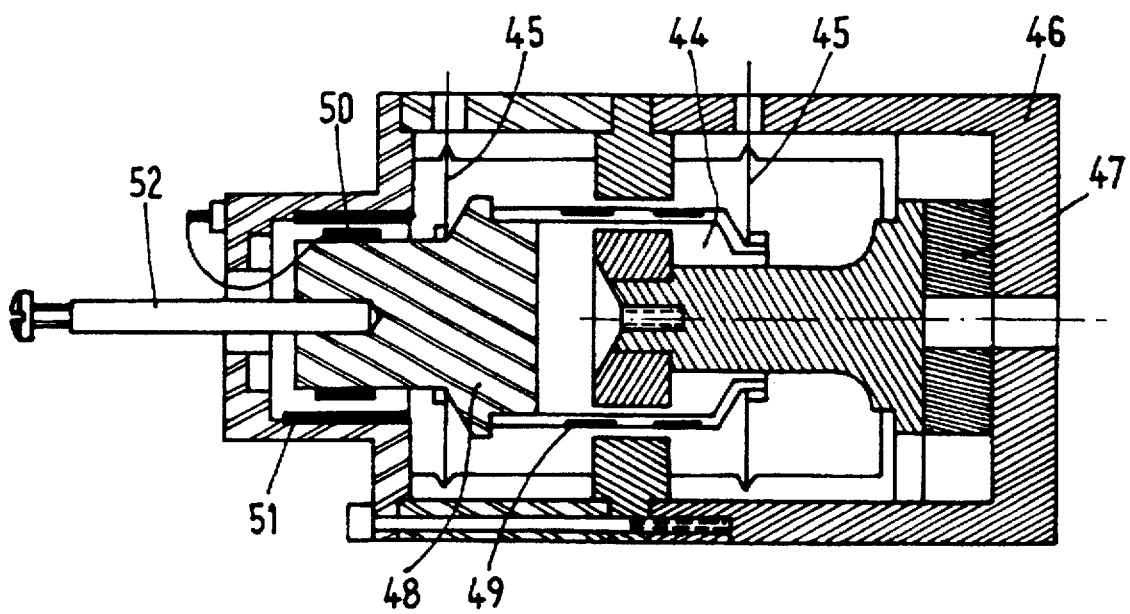
FIG. 5 is a sectional view of a motor-detector unit employed for positioning the stabilized mirror.

The motor-detector devices 35a, 35b, 36a and 36b are shown in detail in FIG. 5. They are of the type having a coil 44 with air circulating in a magnetized air yap which has no friction torque and no viscous torque. This air coil 44 is guided by spring spiders 45. The motor-detector devices comprise an iron base 46 magnetized by a permanent magnet 47 and a movable armature 48. The movable armature 48 carries on one hand two driving coils 49 and on the other hand an excitation coil 50 for forming the detector, this excitation coil being movable in a sensor coil 51. The end 52 of the movable armature is connected to the input mirror to which it transmits the driving force.

It will be understood that the present invention has been described merely for purposes of explanation which is in no way intended to be limitative and that it is possible to introduce therein modifications of detail without departing from the scope of the invention as defined in the claims.

What is claimed is:

1. Supporting platform for optical target observation, acquisition and tracking apparatuses, wherein input and output radiations are reflected by a single input mirror, said platform arranged to be mounted on a carrier vehicle by a gimbal mounting whereon said mirror is stabilized by a gyroscope to which it is servo-controlled through a linking with a transmission ratio of 1:2 about a first vertical bearing axis and through a linking with a transmission ratio of 1:1 about a first horizontal elevation axis, optical apparatuses and gyroscope-mirror assembly being mounted and fixed within a casing pivotally mounted about a second horizontal elevation axis in a bearing itself being pivotal about a second vertical bearing axis, and further wherein said casing and said bearing are servo-controlled about said second axes and respectively by motors driven from signals output by detectors connected to the input mirror for measuring variations in the angular position of said mirror, and wherein said platform comprises a gyrometer fixed to said casing and having a measuring axis which is perpendicular to the measuring axes of the gyroscope-mirror assembly when said platform is in a "canonic" position, in which said second horizontal elevation axis and second bearing axis are reciprocally perpendicular therebetween and to a sight axis of the optical apparatus, the output of said detectors leading to an integrator connected to an amplifier, an output thereof being connected to the terminals of a motor for resetting the casing about the second horizontal axis.

2. Supporting platform according to claim 1, wherein the gimbal mounting and the input mirror are provided with flexible pivots which, through elastic deformation thereof, permit a small angular movement about the first and second bearing axes and the second elevation axis.

3. Supporting platform according to any one of claims 1 and 2, wherein the motors driven by signals for servo-controlling the input mirror to the gyroscope are linear motors, and said detectors connected to the input mirror are linear detectors.

* * * * *